Sept. 7, 1965  K. GEYS  3,205,152
APPARATUS FOR THE PREPARATION OF MALT
Filed April 12, 1962  10 Sheets-Sheet 2
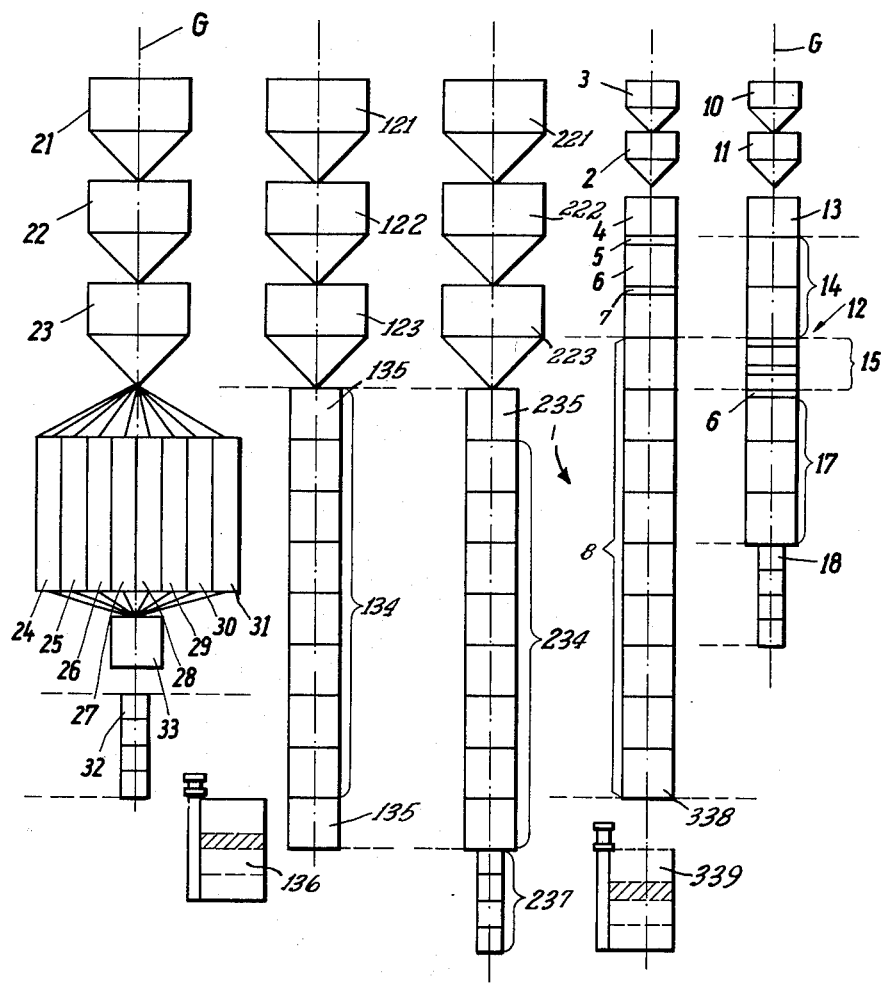
Inventor:
KARL GEYS
BY Kenwood Ross
ATTORNEY.

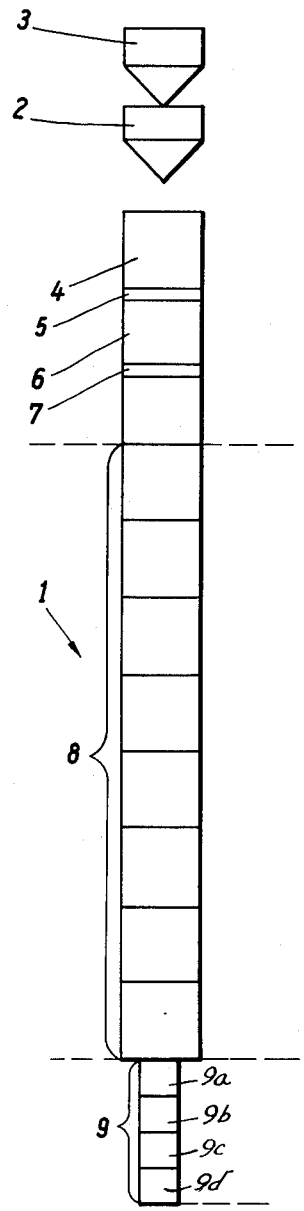

Sept. 7, 1965 K. GEYS 3,205,152
APPARATUS FOR THE PREPARATION OF MALT
Filed April 12, 1962 10 Sheets-Sheet 3

Inventor:
KARL GEYS
BY Kenwood Ross
ATTORNEY.

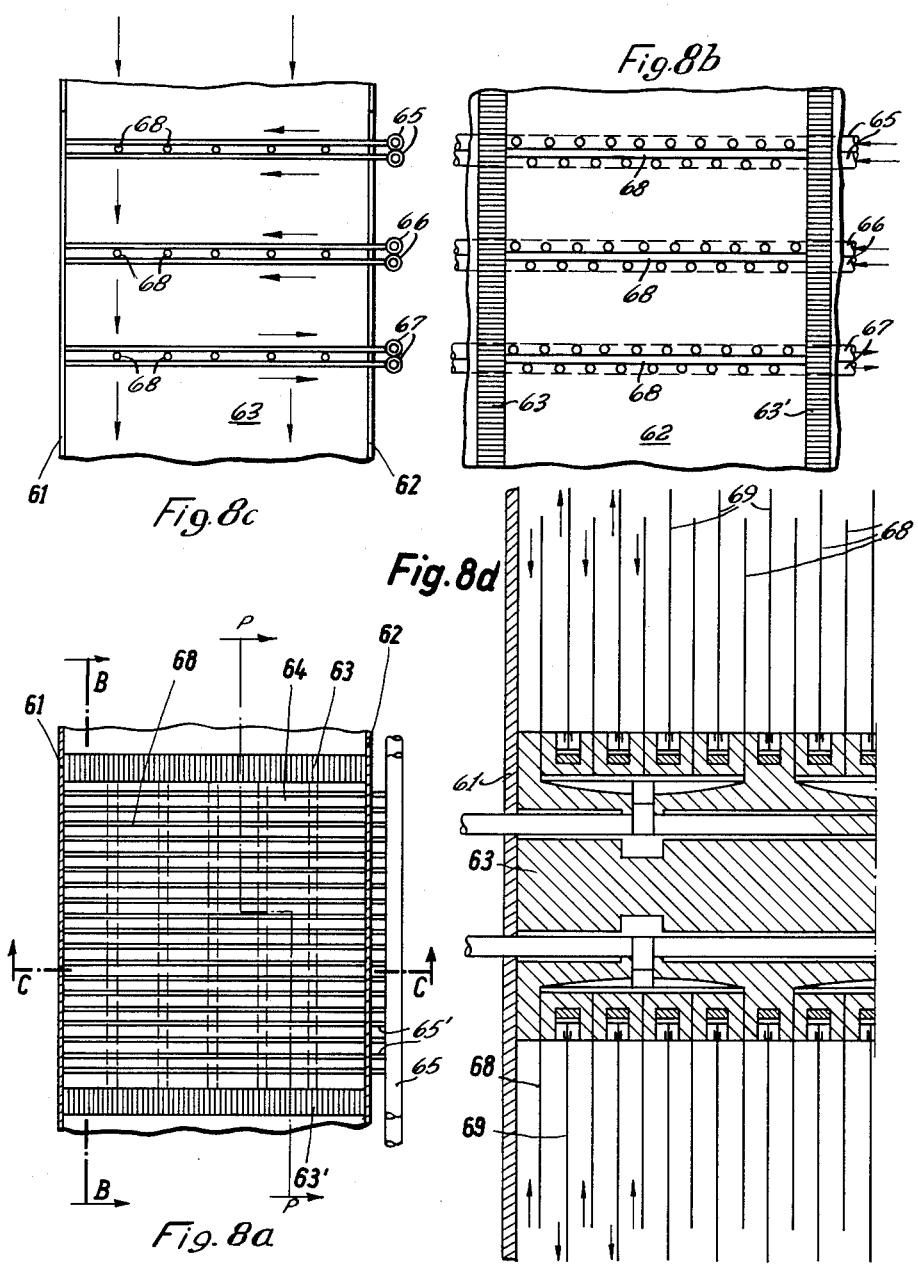

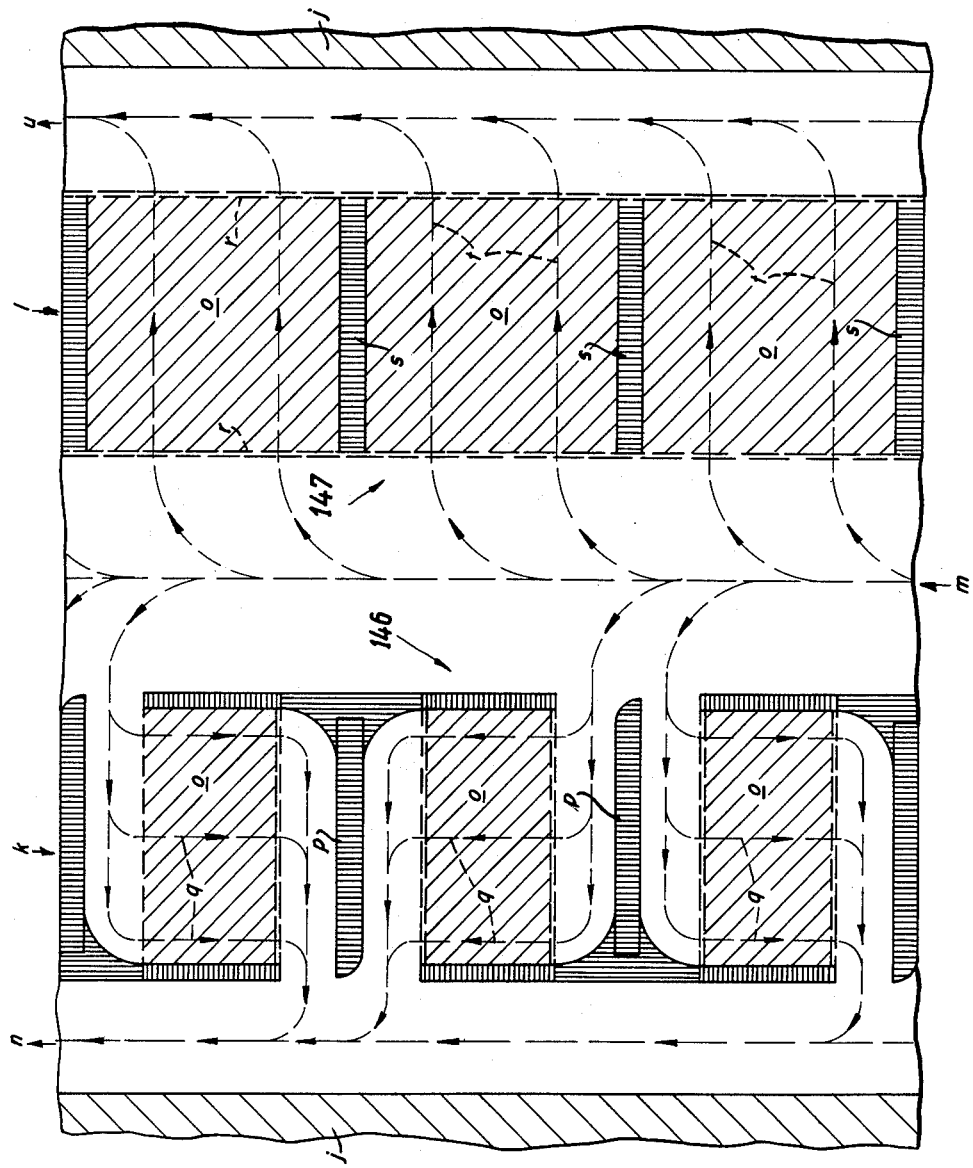

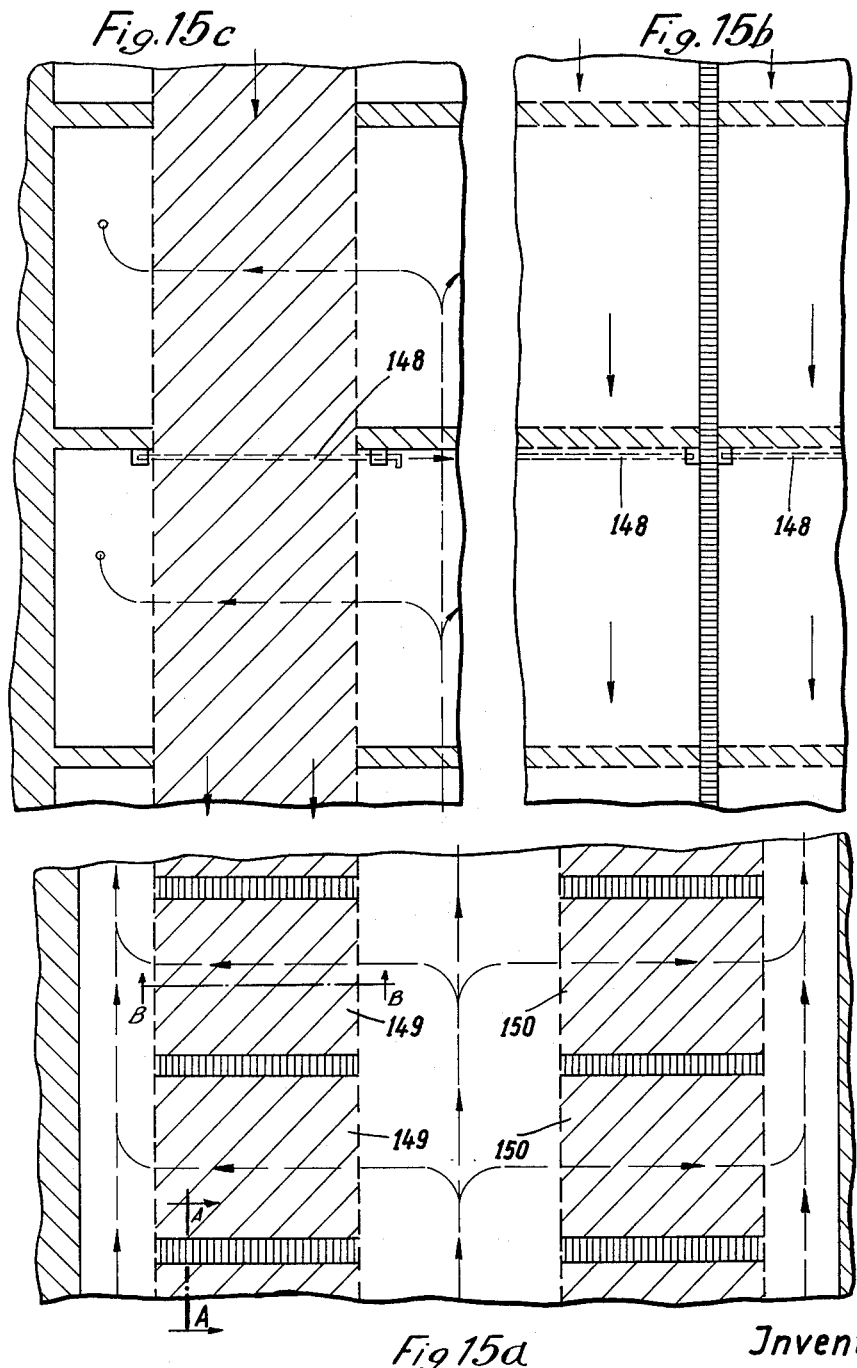

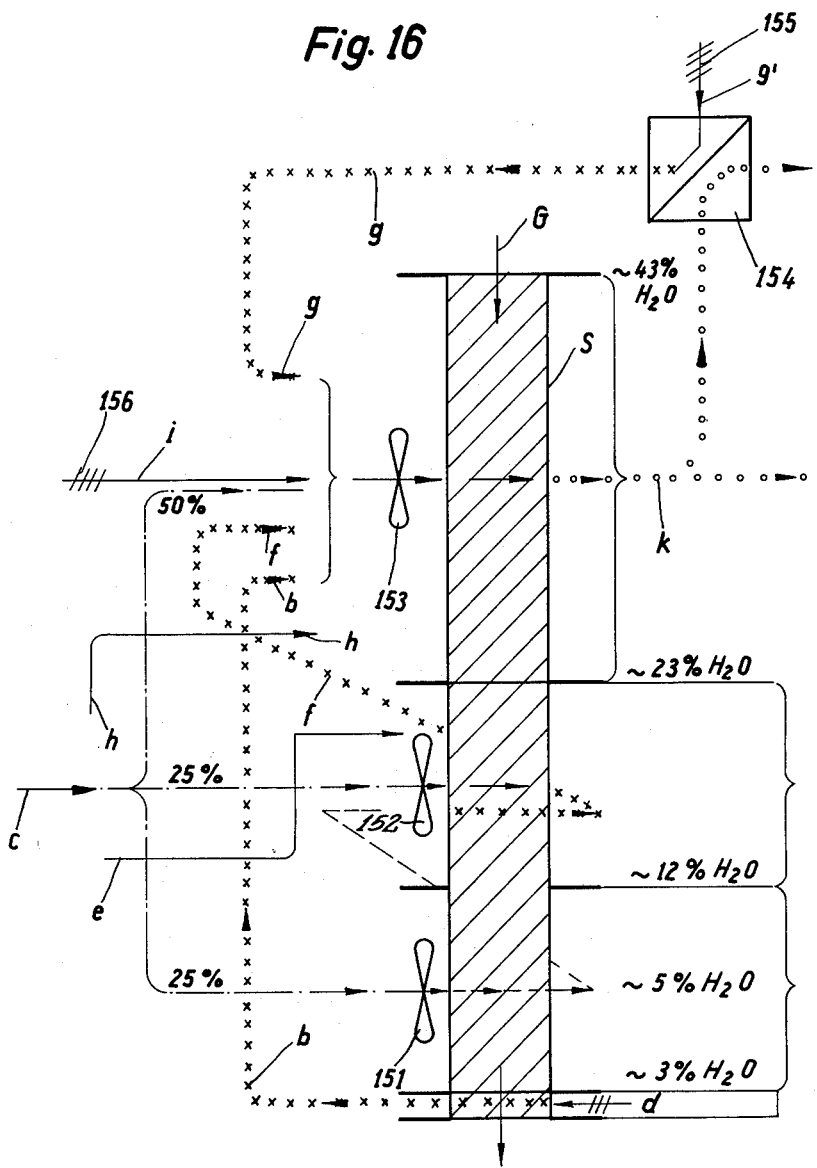

Sept. 7, 1965 K. GEYS 3,205,152
APPARATUS FOR THE PREPARATION OF MALT
Filed April 12, 1962 10 Sheets-Sheet 10
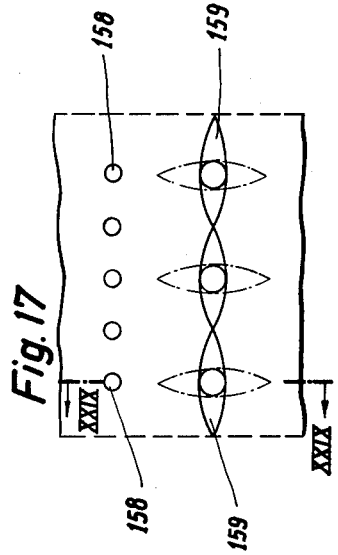
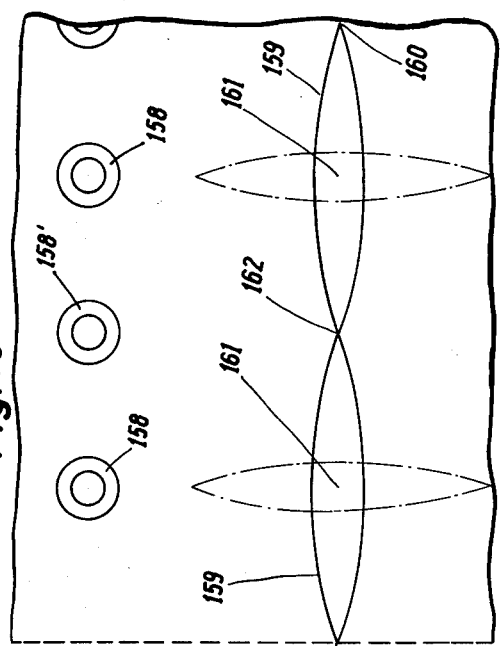
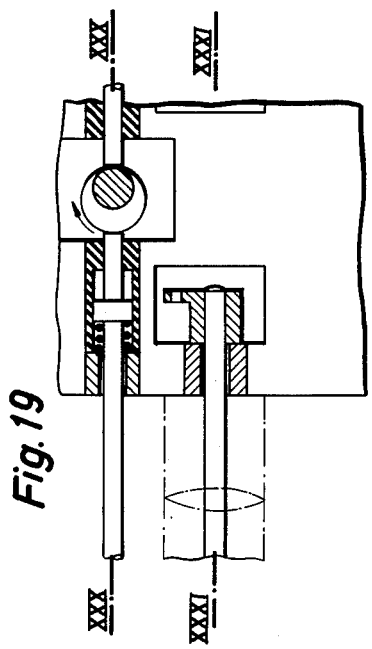
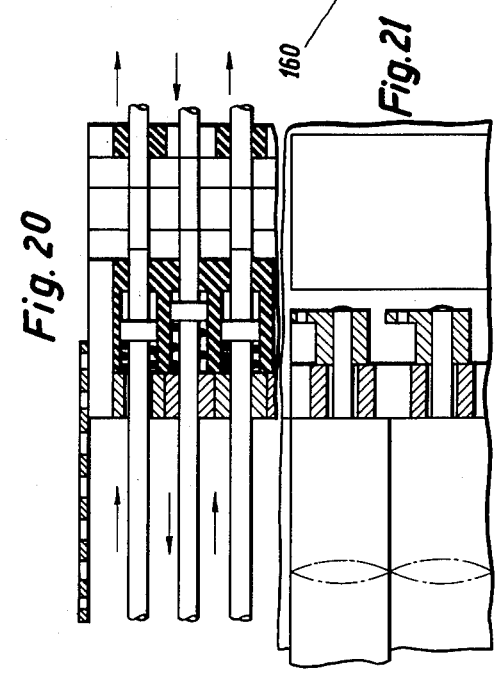
Inventor:
KARL GEYS
BY Kenwood Ross
ATTORNEY.

No. 3,205,152
Patented Sept. 7, 1965

3,205,152
APPARATUS FOR THE PREPARATION OF MALT
Karl Geys, 81 Frankfurter Strasse, Wurzburg, Germany
Filed Apr. 12, 1962, Ser. No. 186,889
Claims priority, application Germany, Apr. 15, 1961, G 32,069, G 32,070; Sept. 23, 1961, G 33,192
8 Claims. (Cl. 195—129)

In the preparation of brewer's malt, the cereals are subjected consecutively to a steeping treatment, germination treatment and curing treatment. Conventionally, these three treatments are effected intermittently, i.e. periodically, and after each individual treatment, the material being treated (hereinafter referred to as the "treatment material") must be moved to the place where the apparatus for performing the next treatment is situated. Large floor areas and a relatively large amount of labour are required for the performance of the known process and the costs thereof are therefore high.

It is a main object of the invention to reduce the surface area required for performing the various treatments for the production of brewer's malt, to reduce costs, and considerably to reduce the dust, dirt and heat which the operators have previously had to suffer.

To this end, according to the invention, at least one treatment is performed continuously on a stream of material flowing continuously in a vertical column. The treatment which has previously been effected substantially in a horizontal plane is shifted, in accordance with the invention, into a vertical plane. The treatment material is supplied to the various treatment stages automatically by its own weight. In contrast to previous procedures, there is no need to convey the treatment material between the consecutive treatment stations, since the treatment material is supplied automatically to the various treatment stages.

The invention also provides an apparatus for performing the process. Such apparatus comprises at least one column, with the characterising feature that discharge devices, which extend transversely through the column, are disposed one above another a number of times vertically of the column, and are each in the form of a single layer of bars placed adjacent one another riddle-fashion, immediately adjacent bars being movable horizontally in opposite directions, the spacing between the bars being such that the treatment material trickles through them when the bars move but is substantially prevented from trickling when the bars are stationary. Conveniently, the vertical spacing between the discharge devices is such as not to lead to the treatment material on any discharge device being compressed excessively by its own weight.

Conveniently, in order that there may be a transverse flow of gas through the treatment material passing through the column, at least in one particular section thereof, the longitudinal walls of the column are perforate in such section. The discharge devices can take the form more particularly of riddles, the various bars of which can be solid or hollow. If the bars are hollow, gases or liquids can be introduced via the discharge devices into the column, the tubular riddle bars having their main surfaces formed, for this purpose, with apertures and being connected externally to appropriate piping. If required, a sub-atmospheric pressure can be applied to the treatment material through the hollow riddle elements. The application of sub-atmospheric pressure may be useful, for instance if, in its movement, the treatment material evolves gases which must be removed. It is also useful if a liquid, with which the gas has been wetted or irrigated, has to be removed by suction.

The vibratory motions of the riddles (such motions producing the vertical movement of the treatment material which would otherwise rest largely on the discharge devices) can be produced, for instance, by each individual bar being reciprocated individually. Very advantageously, however, the bars associated with one riddle group are movable simultaneously and to opposite hands by a common shaft operating through cams and springs, the bars of one group engaging comb-wise between the bars of the other group so that any two adjacent bars are always moved to opposite hands. Alternatively, the movement to opposite hands can be produced by a single camshaft, in which event the cams are appropriately staggered on the shaft. Conveniently, the drive elements which are directly operative on the riddles are received in a hollow part of the transverse partitions which, if required, subdivide the column into component columns. In such a case, the driving elements are moved by those of their ends which are near the transverse partition. A very advantageous system for producing the vibratory motion is for the riddles to have those of their ends which are remote from the driven ends rubber-mounted in the transverse partition, for horizontal movement. If the drive for the discharge devices is disposed in the end walls, each riddle bar, if mounted in the transverse partitions, can extend through all the component columns.

The speed at which the treatment material trickles through the column can be controlled by varying the exit speed in association with the movement sequences of the discharge devices.

To allow for possible changes in volume of the treatment material, the distance between the column walls considered vertically of the column can be varied in dependence upon such change in volume.

Two initial steeping tanks disposed vertically one above another can precede the vertical column, the capacity of each such tank corresponding to a feed or treatment time of about three hours. Also, a supply container comprising a dispensing roller can be disposed above the top initial steeping tank.

The invention leads to substantially automatic producing of malt, the cereals being introduced into the top of the apparatus and being removed from the bottom thereof as ready-to-use brewer's malt; alternatively, only some of the treatment can be effected vertically, the remainder being effected conventionally.

The invention will be described further, by way of example, with reference to the accompanying drawings wherein:

FIG. 1 diagrammatically illustrates an apparatus for the continuous production of brewer's malt in accordance with the invention;

FIG. 2 diagrammatically illustrates an apparatus for combining conventional and continuous treatment of cereals;

FIG. 3 illustrates another apparatus for combining conventional and continuous treatment of trickling material;

FIG. 4 diagrammatically illustrates an alternative form of apparatus for combining conventional and continuous treatment of trickling material;

FIG. 5 diagrammatically illustrates another alternative form of an apparatus for combining conventional and continuous treatment of trickling material;

FIG. 6 diagrammatically illustrates an apparatus for a shortened process for the continuous production of brewer's malt;

FIG. 8 illustrates part of a shaft comprising a number of sections;

FIG. 8a shows a group drive of lattice bars of the vertical discharge devices;

FIG. 14 is a cross-section through a twin shaft, showing gas flowing outwards from the line of symmetry through the subdivisions of one shaft and also flowing outwards from the line of symmetry, but with an offset of 90°, through the subdivisions of the other shaft;

Figure 7:
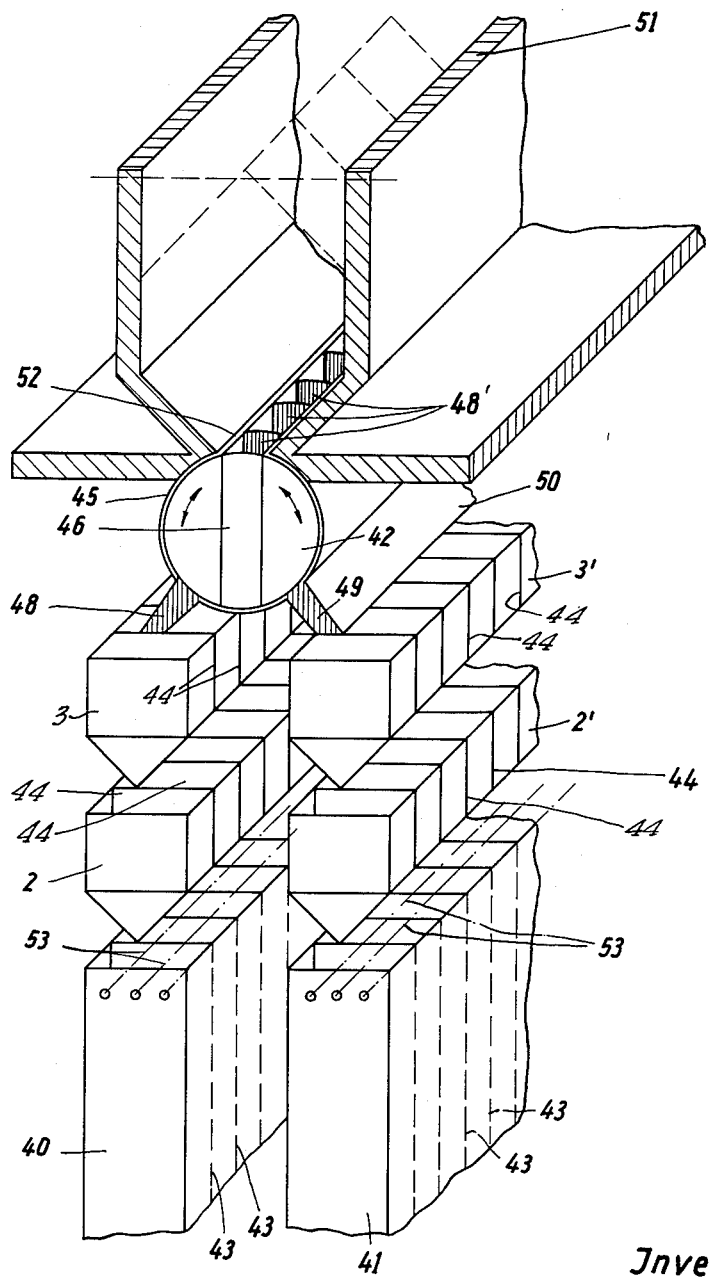
FIG. 7 illustrates a dispensing device.

FIG. 15 gives a plan view and two side views of another form of twin shaft;

FIG. 16 is a diagram which shows the movement of air or gas in an individual shaft in which malt is dried and cured in a number of subdivisions of the shaft;

FIG. 17 is a front elevation of part of a shaft comprising a discharge device with a locking device therebelow;

FIG. 18 is a view, to an enlarged scale, of part of FIG. 17;

FIG. 19 is a sectional view taken along the line XXIX—XXIX of FIG. 17;

FIG. 20 is a secitonal view taken along the line XXX—XXX of FIG. 19; and

FIG. 21 is a sectional view taken along the line XXXI—XXXI of FIG. 19.

Referring to the apparatus illustrated in FIG. 1, initial steeping tanks 2, 3 are disposed above a trickling shaft of column 1. Barley is introduced into tank 3 and given conventional wet steeping treatment therein for three hours with ozonised water, alkaline steeping liquor or skinnings-removing agent, or the like. Aeration is unnecessary because ozonised water is used. The steeping liquor can, if required, be recirculated, in which event it is regenerated and tempered and made up as required. After three hours steeping, the steeped barley passes from tank 3 to tank 2. The empty tank 3 has any adherent grains cleaned away by means of compressed air or water spray, and is then refilled with barley for steeping.

The material in the tank 2 is steeped with ozonised water for a further three hours, whereafter the steeped material, without water, is supplied to the column 1, passing therethrough vertically at a rate of about six centimetres per hour. In section 4 of the column 1, which the material takes about eighteen hours to pass through, dry steeping is effected. Carbon dioxide, which is evolved, is removed by appropriate means. During steeping, the material is one metre or less high in the initial steeping tank 2.

After its treatment in the section 4, the material can be irrigated with ozonised water in a subsequent section 5, the height of which is such as to correspond to the vertical distance covered by the material in three hours. At the end of the section 5, the material is subjected to a suction treatment to remove the treatment liquid. From the section 5, the material passes to the next section 6 where it is subjected to a further dry steeping treatment, with appropriate removal, by suction, of the carbon dioxide evolved. The height of the section 6 corresponds to the vertical distance covered by the material in about twenty-one hours. From the section 6, the material passes to the next section 7, the height of which is the same as the height of the section 5. In the section 7, the material is subjected to a further wetting and suction treatment. From the section 7, the material passes to section 8, where germination commences. The height of the section 8 corresponds to the vertical distance through which the material trickles in a period of from about six to eight days. After the treatment in the section 8, green malt is available and passes to section 9 where curing is effected.

The descending green malt is dried in three temperature zones. The malt is then called in another zone. The rate of trickle is about from nine to ten centimetres per hour. The green malt is subjected to air-drying and initial drying treatment, with maximum removal of water, in the top zone. The second zone, wherein the temperature is from about 65 to 70° C. (peptionising residue) is for preparation for kiln-drying. Kiln-drying is effected in the third zone at a temperature of about 85° C.; in the third zone, all except about 3% of the water content of the malt is removed therefrom. The malt is then cooled in the zone immediately below, the height of which is much less than the height of the other zones.

The total time required to produce malt in a vertical flow process can be reduced considerably by using the arrangement illustrated in FIG. 6; wherein the barley G is first supplied to an initial steeping tank 10 corresponding to the tank 3 shown in FIG. 1. After wet steeping for three hours, the material passes from the tank 10 to a second initial steeping tank 11 where it is wet steeped with ozonised water for a further three hours. From the tank 11, the material passes to a trickle column 12 wherein it is subjected to air-drying in section 13 for about eighteen hours. The length of the section 13 corresponds to the vertical distance covered by the trickling material when moving at a vertical speed of about six centimetres per hour. The carbon dioxide evolved in the air-drying is removed by appropriate means. During its eighteen hour stay in the section 13, the material can be irrigated with ozonised water once or twice more, then subjected to suction treatment. The material then passes to section 14 for initial germination; the length of the section 14 corresponds to the vertical distance covered by the initially germinating material in from two to three days, when moving at a rate of from six to eight centimetres per hour. The section 14 is in the form of a vertical column having perforate walls. In this region, conditioned air is fed horizontally through the material being treated. Rockable discharge devices spaced about forty to sixty centimetres apart vertically from one another are provided in the column. The material at the end of the section 14 is in the form of a cool loose consistent young green malt. If required, a short wet treatment with Gibberellic acid of appropriate concentration, followed by suction (possibly circulatory, with make-up) can be given at an appropriate time, for instance, at the start of initial germination.

Following the initial germination in section 14, the green malt is given further irrigation in section 15 for a period of up to twenty-four hours, then subjected to suction treatment. The wet treatment effected in the section 15 is carried out with oxygen-depleted, oxygen-free, or carbon-dioxide-enriched water, possibly derived from a second steeping treatment, with inhibition of oxygen entry from the top or by an introduction of carbon dioxide from the top and by removal of carbon dioxide by suction below the wet-steeping station. This step saves shrinkage. The sealing and suction, involving carbon dioxide, can be effected by means of an apparatus such as shown in FIGS. 17 and 18. The length of section 15 corresponds to the vertical distance covered by the trickling material during this time. After the wet treatment in the section 15, the green malt is dried in section 16 for a number of hours for after germination (standardisation or reduction of water content).

Upon reaching section 17, the green malt is subjected to after-germination treatment, being aerated with conditioned air to supply the germinating material, now free from surplus water, to the "solution" again. Germination can continue normally or with a carbon dioxide residue. The after-germination time in section 17 lasts for from two to three days.

The treatment with Gibberellic acid, or the subsequent steeping, shortens the total germination time to about five or six days. The trickling rate during germination is from eight to ten centimetres per hour.

From the section 17, the new green malt enters section 18 where it is cured exactly as in section 9 of the apparatus shown in FIG. 1.

To use the advantages of the vertical column flow process in malt preparation while still using at least some of the conventional arrangements, it is advisable for at least some of the individual treatments which have previously been performed periodically to be performed by a vertical flow process, and the combinations which will now be described with reference to FIGS. 2 to 5 are particularly suitable for this purpose.

Referring now to the arrangement of FIG. 2, in the arrangement of the latter steeping and germination are conventional, but curing is performed in a trickle column in the manner described with reference to the element 9 of FIG. 1. In actual fact, steeping tanks 21 to 23 are not usually placed one above another, but are disposed beside one another. The salad in boxes indicated by reference numerals 24 to 31 are also disposed one beside another. An intermediate column 33 precedes the trickle column 32. Barley G is charged into the tank 21 on a twenty-four hour basis, then removed therefrom and charged into the tank 22 whence it is charged into tank 23. It then passes to the salad in boxes where it remains for about eight days. The green malt thus produced is then supplied periodically, for instance, on a twenty-four hour basis, to the intermediate column 33 which is disposed above the trickle column 32 and which serves to provide for time-compensation. The column 33 serves as a supply vessel, for the trickle column 32, from which green malt is made up to the same extent as it trickles through the column 32; in its passage through column 32, the green malt is subjected to conditioned aeration.

Referring to FIG. 3, which diagrammatically illustrates how conventional batchwise operation can be combined with the vertical flow process according to the invention, steeping and curing are conventional but germination is effected in a trickle column. Steeping is performed in tanks 21 to 23. From the tank 23, the material being treated is supplied periodically, for instance, on a twenty-four hour basis, to an intermediate time-compensating column 35 disposed above a trickle column 34. The material is supplied from the column 35 to the column 34 to the same extent as the material in column 34 passes therethrough. The material being treated undergoes germination, of the kind described with reference to the part 8 of FIG. 1, more particularly in the column 34. From the exit thereof, green malt is supplied periodically, for instance, on a twenty-four hour basis, through another time-compensating intermediate column 35 to a conventional kiln 36 and subjected to further treatment therein.

Referring to the combination shown in FIG. 4, the only conventional part of the treatment using the apparatus shown is the steeping in tanks 21 to 23, germination and curing being performed in trickle columns 34, 37 disposed above one another. As in the previous embodiment, a time-compensating intermediate column 35 precedes the trickle column 34.

In the combination illustrated in FIG. 5, steeping and germination are performed using the vertical flow process according to the invention whereas curing is conventional. The arrangement of the initial steeping tanks and of the trickle columns is the same as the arrangement of the steeping and germination columns in the arrangement illustrated in FIG. 1. Following the exit of the trickle column 8 is a time-compensating intermediate column 38 adapted to receive the green malt. From the column 38 the green malt passes to a kiln 39 wherein it is subjected to further treatment in conventional manner.

The arrangements shown in each of FIGS. 1, 5 and 6 are each preceded by a barley supply tank (not shown) comprising a dispenser by means of which barley is automatically taken from the supply tank at the required intervals of time and supplied in the desired quantity to the initial steeping tanks 3 and 10 respectively.

In the construction illustrated in FIG. 7, two columns 40, 41 which together form a twin column are fed by a single dispensing roller 42. Initial steeping tanks 2, 3 precede the column 40, and initial steeping tanks 2', 3' precede the column 41. Each column 40, 41 is subdivided by partitions 43 into component columns of equal cross-section. The respective tanks 2, 3 and 2', 3' are correspondingly subdivided by partitions 44 arranged to be in alignment with the partitions 43 below them. The dispensing roller 42 is adapted to rotate in a cylinder 45, and the generated surface of the roller 42 is in sealing engagement with the inner surface of the cylinder 45. The latter is formed with a rectangular elongated aperture disposed diametrically in the roller. Such aperture is open at the top and closed at the bottom and bounded at its ends by walls 46. Disposed in the chamber thus formed are partitions 48 which are in alignment with the partitions 44. Two troughs 48, 49 engage with the outer periphery of the cylinder 45 and comprise deflectors 50 which are also in alignment with the partitions 44. Above the dispensing roller 42 is a supply tank 51 which is formed with a slot 52 of the same width as the dispensing chambers.

The barley is supplied to the supply tank 51, for instance, from a silo (not shown) by means of a feed auger; the latter operates in dependence upon the level of the barley in the tank 51. Feed auger operation is automatic and is controlled, for instance, photo-electrically. The dispensing roller 42 dispenses barley alternately via the respective troughs 48 and 49, to the respective tanks 3 and 3'. The supply tank 51 is recharged as it empties, with or without a delay to allow for compressed air or water-spray cleaning of the initial steeping tanks to clear the same of grain sticking to them. The emptying of the tanks 2, 3 and 2', 3' can be timer-controlled. Smoothers 53, for instance in the form of rakes, are provided at the top end of the columns or shafts 40 and 41.

The preparation of malt can be completely automated by using the vertical flow process of the invention for all the treatments required to produce brewer's malt. A fully automated system can be used, if required, for small-scale malting operations.

The column illustrated in FIG. 8 is a vertical column of rectangular cross-section, having short transverse partitions which are imperforate, whilst the long side walls 61, 62 thereof can be solid or perforate. Partitions 63, 63' subdivide the column into a number of component columns of substantially similar cross-section. One such component column 64 is shown in FIG. 8. Discharging, irrigation and suction devices are disposed along the column vertically thereof and extend therethrough. The irrigation and suction devices illustrated in the drawings are indicated by the reference numerals 65, 66 and 67; the actual discharge devices are disposed above them. The discharge devices can be of the reciprocating or rockable kind; when stationary such discharge devices substantially prevent the passage of material, and when in motion they assist movement of the trickling material. The vertical spacing between the discharge devices is such that the vertical pressure produced by the weight of the trickling material is below the pressure permissable for the material being treated.

Figure 9:
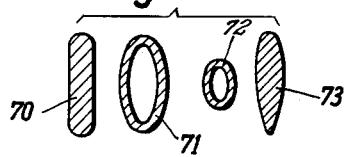
FIG. 9 illustrates various cross-sectional shapes of the lattice bars.
Figure 13A:
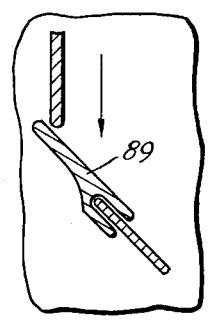
FIG. 13 is a view showing the transitions in shaft subdivision:
 (a) with a straight rockable transition element;
 (b) with a curved rocking transition element;
 (c) at a transition from one to three channels;
 (d) for vertical trickling, and
 (e) for deflected trickling.
Figure 13B:
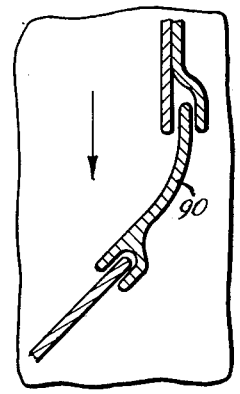
Figure 13C:
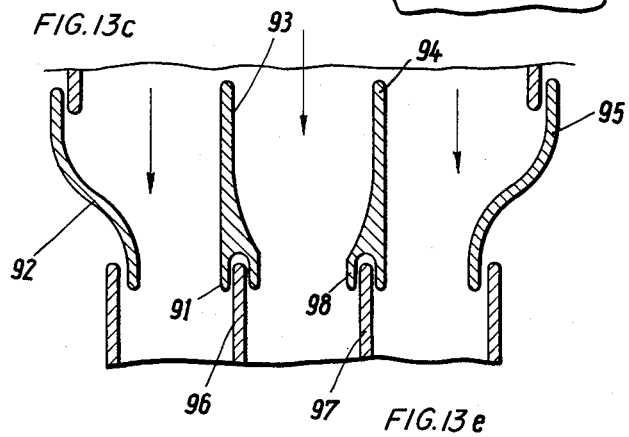
Figure 13D:
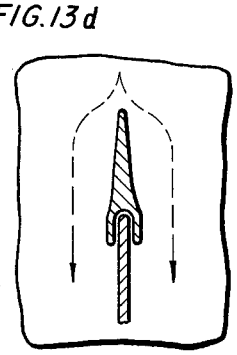
Figure 13E:
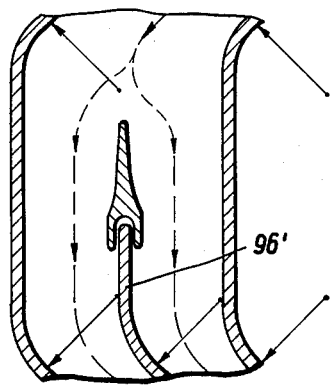

The discharge devices take the form of riddle bars 68, 69, arranged in groups, as will be apparent from FIG. 8a. The riddle bars can take the form, for instance, of flat upright bars 70 (FIG. 9) or of oval tubes 71 or of flat tubes 72 or of pear-sectioned elements 73 or, of course, of other shapes as desired.

Figure 10:
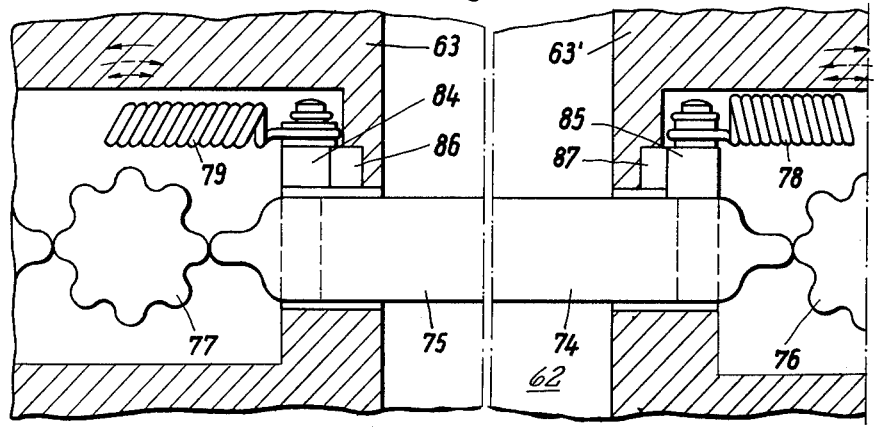
FIG. 10 is a side elevation of a lattice drive.
Figure 11:
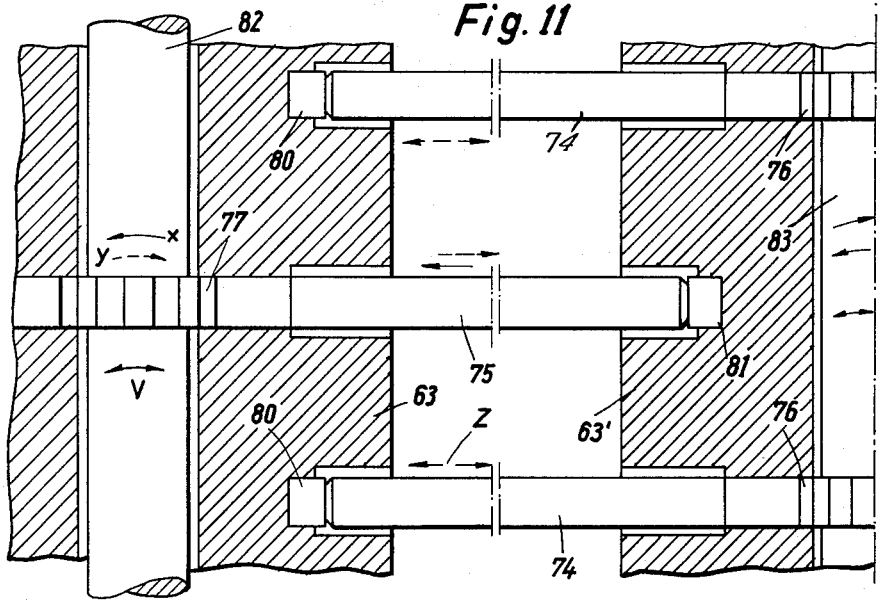
FIG. 11 is a plan view of the lattice drive illustrated in FIG. 10.
Figure 12:
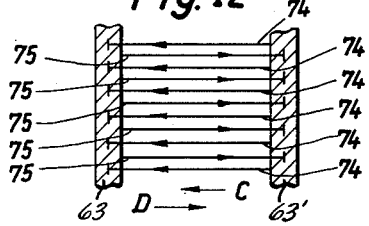
FIG. 12 is a view showing how the free ends of the lattice bars are received.

The riddle movement required to make the treatment material move can be provided, for instance, by reciprocating pivotal movement of the various riddle bars around their respective longitudinal axes, but in a preferred form of the invention, the riddles are reciprocated horizontally. This is how shaking motion of the riddles is produced in the embodiment illustrated. In such embodiment, the riddles are in the form of two groups of bars or rods adapted to be driven from opposite sides of the column. Referring to FIGS. 10–12, the riddle bars of one group are indicated by the reference numeral 74, and the riddle bars of the other group are indicated by the reference numeral 75. Each individual bar 74, 75 co-operates with a driving disc cam 76, 77 respectively and is pressed thereagainst by means of a respective spring 78, 79 so as to be reciprocated, as indicated by arrows Z, when the corresponding disc cam is rotated or pivoted. The free ends of the riddle bars bear against resilient abutments 80, 81 respectively in the respective partitions 63, 63′. Each disc cam 76, 77 can operated, simultaneously, two riddle bars extending to opposite hands if the riddle drive is disposed within the partitions 63, 63′, for instance, as illustrated in FIGS. 10 and 11. In this event, a shaft 82, 83 respectively extends through the partitions at the level of the discharge devices, the shafts 82, 83 each bearing a respective disc cam 76, 77 opposite the respective riddle bars 74, 75; the springs 78, 79 interconnect the two riddle bars which co-operate with a single disc cam and which are disposed on opposite sides thereof.

Abutments 84, 85, which are disposed on the riddle bars 74, 75 and which are engaged by the springs 78, 79, engage under pressure with resilient buffers 86, 87, for instance, of rubber. Therefore, each riddle bar is, as it were, clamped or embedded at one end in a rubber abutment and forms an oscillating system. When the shafts 82, 83 are rotated as indicated by the arrows X or Y or are rocked as indicated by the arrow V, matters can be arranged so that each two bar groups associated with a single discharge device oscillate to opposite hands. For instance, at a given time the bars 74 are moving in the direction of arrow C while the bars 75 are moving in the direction of arrow D (FIG. 12).

If a transverse flow of gas is required through the column, the longitudinal walls 61, 62 are perforate. Such perforate walls can be made of hurdle plate and/or sectioned wire hurdles or possibly of some other appropriate substance, such as a ceramic substance.

To vary the rate of trickle of the treatment material in the column or to alter the layer thickness of the flow of treatment material, as measured transversely, the column can be narrowed or widened. To ensure that material does not back up at the narrows thus produced, it is advisable to provide appropriately shaped transition elements 92 to 95 (FIG. 13) at the transition zones, such transition elements being rockable. The transition elements can be rocked by a drive very similar to the riddle drive.

The transition elements 93, 94 are formed opposite to deflecting surfaces 92, 95 with grooves 91, 98 in which the guiding surfaces engage after the fashion of springs. The transition elements 93, 94 can, therefore, oscillate in the direction of the grooves relatively to the surfaces 95, 96.

To ensure that the layer of trickling material is thin in the flow direction of the gas used for drying or curing, the column can be subdivided as is the column 146 illustrated in FIG. 14. This column 146 co-operates with column 147 to form a twin column through which gas flows from the inside to the outside. The layer thickness of column 146 is half as wide as the layer thickness of the column 147.

In order that each column portion may be separated from the remainder of the column, the construction illustrated in FIG. 15 has closure slides 148 at intervals along the vertical extent of the column, preferably at the discharge places. By means of such slides, a column portion of varying size can be shut off from the remainder of the column at the required height, the slides 148 which bound the part of the column concerned being pushed into the closure position (on the left in FIG. 15). As will be apparent from the plan view, the column illustrated in FIG. 15 is a twin column having component columns 149, 150 through which gas can flow from the line of symmetry outwards to both hands in identical fashion. The gas flow is the same at all levels.

Where a vertical column is used to cure green malt, the procedure can be, for instance, as will now be described with reference to FIG. 16, wherein green malt G is introduced into the top of a column S; first trickles down through the stewing zone, extending over approximately 50% of column length; then passes into the drying zone; then into the finish-drying zone and finally into the cooling zone. The drying zone and the finish-drying zone each take up substantially 25% of column length, and the length of the cooling zone is only about 3.5% of column length.

Cooling air $a$ is conveyed through the material being treated in the cooling zone. The cooling air $a$ is heated as it passes through the material and is supplied as preheated air $b$ to the stewing zone. Of the total hot air $c$ which is required and which comes, for instance, from the kiln firing system, 25% is conveyed by fan 151 through the finish-drying zone. The air $d$ issuing therefrom, together with 25% of the hot air $c$ and a fresh air component $e$, is supplied by a fan 152 to the drying zone. The air stream $f$ issuing therefrom is conveyed to the stewing zone, and the same is also supplied with 50% of the hot air $c$. The stewing zone is also supplied with preheated fresh air $g$, with the waste heat $h$ from the fire box and with relatively fresh air $i$. The various streams $b, c, f, g, h, i$ are forced through the trickling material in the vicinity of the stewing zone by a fan 153.

The gases $k$ from the stewing zone are supplied in winter, spring and autumn to an air preheater 154 where the fresh air $g'$ is preheated. The quantity of preheated air $g$ is adjusted by means of a louvre 155. The gases $k$ are not supplied to the air preheater 154 in the summer. The fresh air stream $i$ is also adjusted by means of a louvre 156 which is open in summer and partly closed in winter.

The green malt G has approximately 43% moisture content when it enters the column, and this figure has been reduced to about 23% at the end of a stewing zone, to about 12% at the end of the drying zone and to approximately 3% at the end of a finish-drying zone.

To provide a simple and easily operated closure below the discharge device, rotatable but axially non-movable flaps 159 are disposed below the reciprocating riddle bars 158 (FIGS. 17 to 21); the flaps 159 can be pivoted either into the solid-line closed position or into the chain-dotted-line open position. When in the closed position the flaps 159 engage with one another by way of their outside edges 160. Disposed above the pivot 161 of each flap 159 is a riddle bar 158. Another riddle bar 158′ is provided above each place 162 where two adjacent flaps 159 contact one another. All the flaps 159 can be operated through a common linkage.

What I claim is:

1. Apparatus for the production of malt, utilizing a column, wherein the material treated passing vertically through said column by its own weight is subjected to different treatments, characterized in that there is provided in said column a plurality of grids one above the other, each grid extending transversely of the entire inside diameter of said column and consisting of a single layer of rods in side-by-side relationship, the respective adjacent rods of each grid being capable of being set in opposing horizontal motion, the mutual spacing of said rods being such that when the rods move in opposite directions, the material to be treated flows through, but when the rods are stationary, the flowing movement is largely arrested.

2. Apparatus according to claim 1, characterized in that the mutual vertical spacing of the plurality of grids is such as to preclude the pressure exerted by the material treated on any one grid from exceeding the permissible pressure loading for the material treated.

3. Apparatus as claimed in claim 1, characterized in that the rods of a grid form two groups capable of being driven from opposite ends, one group comprising rods which are moved forward at a given moment, and the other group comprising rods which are moved backward at a given moment.

4. Apparatus as claimed in claim 1, wherein the column is subdivided into two component columns by means of a vertical partition, characterized in that the rods of a grid group are capable of being operative in both of the component columns and driven simultaneously in opposite directions from one of their ends by means of a common shaft operating through cams and springs.

5. Apparatus as claimed in claim 4 characterized in that the grid rods are mounted for horizontal movement within rubber seated within the vertically-disposed partition at their ends remote from driven ends.

6. Apparatus as claimed in claim 4 characterized in that the grid rods are in the form of tubes having apertures in the surfaces thereof, thereby permitting the introduction of gas for wetting and for suction.

7. Apparatus as claimed in claim 4 characterized in that at suitable locations along the column and below the locations at which the grids are incorporated, shut-off elements are provided, whereby the column can be separated sectionally from its remaining parts in such a manner permitting a batch operation.

8. Apparatus as claimed in claim 4 characterized by separators extending transversely of the column.

References Cited by the Examiner
UNITED STATES PATENTS

| | | | |
|---|---|---|---|
| 409,956 | 8/89 | Gent | 195—129 |
| 672,843 | 4/01 | Renner | 195—128 |
| 1,961,990 | 6/34 | Sleeman | 195—71 X |
| 2,624,560 | 1/53 | Craig et al. | 126—175 X |
| 2,654,691 | 10/53 | Frauenheim | 195—71 |
| 2,671,045 | 3/54 | Rugicka | 195—129 |
| 2,749,280 | 6/56 | Frauenheim | 195—128 |
| 2,805,924 | 9/57 | Smith et al. | 23—283 |
| 2,933,435 | 4/60 | Graff et al. | 195—128 |

FOREIGN PATENTS 749,916  6/56  Great Britain.

A. LOUIS MONACELL, *Primary Examiner.*

ABRAHAM H. WINKELSTEIN, *Examiner.*